United States Patent [19]

Velie

[11] 4,250,908

[45] Feb. 17, 1981

[54] FLOW CONTROL DEVICE

[76] Inventor: Wallace W. Velie, 520 W. Emerson St., Upland, Calif. 91786

[21] Appl. No.: 25,005

[22] Filed: Mar. 29, 1979

[51] Int. Cl.³ .................. F16K 19/00; G05D 11/02
[52] U.S. Cl. ............................................ 137/7; 137/88
[58] Field of Search ............................... 137/87, 88, 7

[56] References Cited

U.S. PATENT DOCUMENTS

| 3,004,548 | 10/1961 | Janes | 137/100 |
|---|---|---|---|
| 3,493,005 | 2/1970 | Kakegawa | 137/100 |
| 3,726,300 | 4/1973 | Chevalier | 137/88 |
| 4,094,333 | 6/1978 | Petursson | 137/100 |

OTHER PUBLICATIONS

Publ.–"Air Loaded Regulators" (Mark 66 and 56), Jordan TM Valve, Div. of Richards Industries, Inc. p. 17.
Publ.–"Type 1107 Regulator" AICA American, Inc. 1p.
Publ.–"Baso Series G50 Automatic Main Valve and Regulator" p. 2.

*Primary Examiner*—Daniel M. Yasich
*Attorney, Agent, or Firm*—Fleit & Jacobson

[57] ABSTRACT

A flow control device is provided for controlling the pressure of a controlled fluid in a secondary line as a function of the pressure of a controlling gas in a primary line. The device includes a pressure regulator having a housing divided into upper and lower chambers by a diaphragm. A pressure divider is connected to the upper chamber in such manner that the pressure in the upper chamber is proportional to the pressure of the controlling gas. The secondary line is connected to the lower chamber. Fluid communication between an upstream portion of the secondary line and the lower chamber is controlled by a valve operatively associated with the diaphragm. When the pressure in the upper chamber is less than a predetermined pressure, the valve blocks fluid communication between the upstream portion of the secondary line and the lower chamber. After the pressure of the controlling fluid exceeds a predetermined pressure, the pressure in the upper chamber, which is a function of the pressure of the controlling gas, moves the diaphragm into a position in which the valve associated with the diaphragm permits fluid communication between the lower chamber and the secondary line. A fixed pressure loss is provided in the device so that there is a difference in pressure changes between the controlling gas compared to the controlled fluid.

11 Claims, 2 Drawing Figures

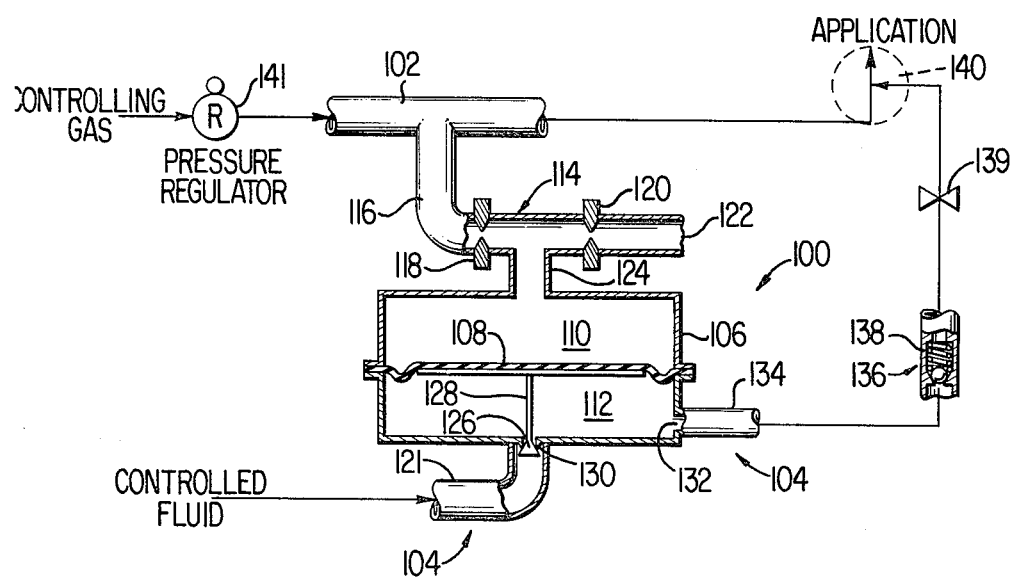
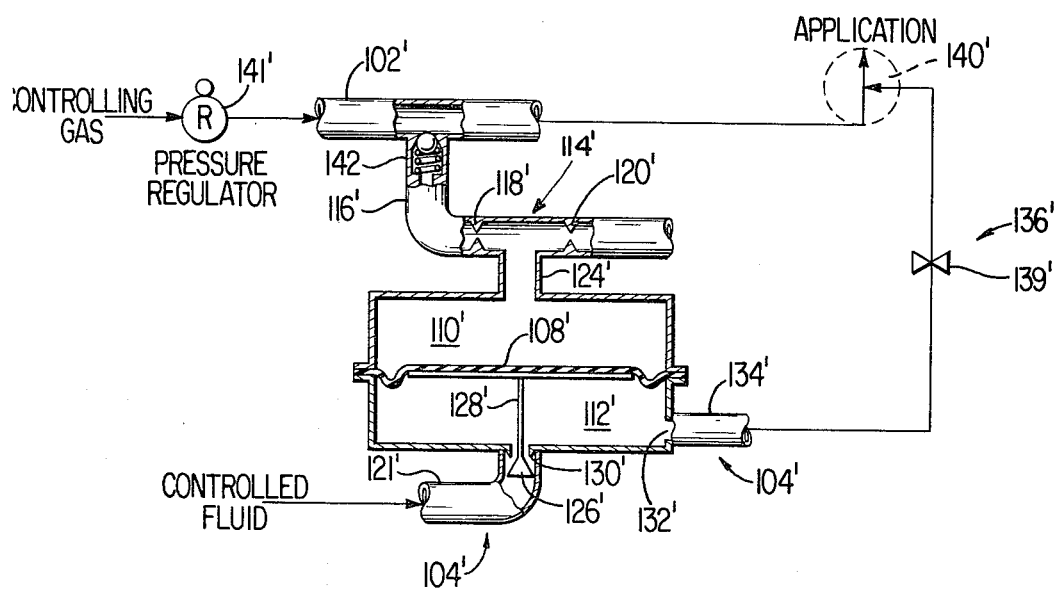

FLOW CONTROL DEVICE

BACKGROUND OF THE INVENTION

1. Field of the Invention

This invention relates to a flow control device which causes fluid pressure in a secondary or controlled fluid line to vary in a prescribed manner in response to pressure changes in a primary or controlling gas line. Thus, the controlling gas controls or modulates flow through the secondary fluid line. The controlled fluid may be either a gas or a liquid.

2. Description of the Prior Art

The demand for more energy efficient engines and appliances has enhanced the need for more flexible flow control devices. For example, gasoline engines are turning to fuel injection for more precise matching of fuel flow over wide ranges of engine requirements. This, in turn, requires a sophisticated flow control device which can sense key engine parameters and resolve them into a mechanical technique of metering fuel. Likewise, boilers and other heating appliances are turning toward load following flow control devices which automatically reduce fuel comsumption as demand decreases and vice versa.

Automatic flow control devices have three common features: (1) a device to regulate fluid pressure or flow, (2) a mechanism to operate that device, and (3) a control means to cause the mechanism to operate in a prescribed manner.

One relatively common flow control device is an air loaded regulator. This device uses a diaphragm or piston to separate the fluid being controlled from the controlling air. Controlling air pressure placed on one side of the diaphragm is balanced by the controlled fluid pressure on the other side of the diaphragm. A change in controlling air pressure causes a corresponding response by the controlled fluid.

There are applications when it is necessary that the controlling air pressure be higher than the desired controlled fluid pressure. In such instances, some device must be used between the source or controlling air pressure and the regulator to reduce the air pressure. Likewise, there are applications which require that a given change in controlling air pressure result in an entirely different change in controlled fluid pressure. For example, it may be desired that a 2:1 change in controlling air pressure result in a 4:1 change in controlled fluid pressure. Such refinements require advanced and unique designs in flow control devices.

SUMMARY OF THE INVENTION

An object of the present invention is to provide a flow control device for controlling or modulating flow of a controlled fluid through a secondary line. The flow control device responds to pressure changes in a controlling gas flowing through a primary line. The controlled fluid can be either a gas or liquid. It will be understood that the term "gas" is being used in a generic sense and is intended to cover both a pure gas and a mixture of gases, such as air.

The flow control device of the present invention incorporates three basic components, namely, a conventional diaphragm or piston-type pressure regulator, a pressure divider, and a mechanism for providing a fixed pressure loss.

The diaphragm, piston-type or other suitable pressure regulator used with the flow control device of the present invention has one side of the regulator referenced to the pressure of the controlling gas in the primary line, and a second side referenced to the controlled fluid in the secondary line. Since one side of the pressure regulator is referenced to the pressure in the primary line, changes in pressure of the controlling gas are automatically transmitted by the pressure regulator to the controlled fluid.

The pressure divider used with the flow control device of the present invention has two orifices arranged in series, with a pressure tap between the orifices. The pressure divider is positioned between the primary line and the pressure regulator, with the pressure tap referenced to one side of the regulator. The inlet of the first or upstream orifice is in communication with the primary line, while the exit of the second or downstream orifice is referenced to atmosphere. In one embodiment, the size of either one or both of the orifices is adjustable to more easily vary the pressure between the orifices relative to the pressure in the primary line. The pressure divider is provided to cause the regulated pressure to be different from that in the primary line. Proper sizing of the two orifices allows selection of any desired regulated pressure below the pressure in the primary line.

The mechanism providing the fixed pressure loss is placed either between the upstream orifice of the pressure divider and the primary line, or downstream of the pressure regulator in the secondary line carrying the controlled fluid. The fixed pressure loss provided by this mechanism results in a controlled fluid pressure change which is different from the change in pressure of the controlling gas. Further, the fixed pressure loss ensures that flow of fluid through the secondary line does not start until there is a minimum or threshold pressure in the primary line carrying the controlling gas.

From the preceding, it will be appreciated that the present invention provides both a device and a method for controlling the pressure of a controlled fluid as a function of pressure variations or changes in a controlling gas.

The invention and its advantages will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 1 is a schematic partial cross-sectional view of one embodiment of a flow control device according to the present invention; and FIG. 2 is a schematic partial cross-sectional view of another embodiment of a flow control device according to the present invention.

DESCRIPTION OF THE PREFERRED EMBODIMENTS

Because flow control devices are well-known, the present description will be directed in particular to elements forming part of, or cooperating more directly with, the present invention. Elements not specifically shown or described herein are understood to be selectable from those known in the art.

Referring now to the drawings, and to FIG. 1 in particular, pressure regulator or modulating valve 100 is positioned in such manner that the pressure of a controlling gas flowing through a primary conduit or line 102 controls the pressure of a controlled fluid flowing through a secondary conduit or line 104. The pressure regulator 100 has a housing 106 divided by a pressure responsive means, such as a diaphragm 108, into a first or upper chamber 110 and a second or lower chamber 112. A pressure divider, which is generally designated 114, is provided to communicate the upper chamber 110 with primary line 102.

The pressure divider 114 has an inlet or upstream portion 116 and first or inlet orifice 118 communicating with the primary line 102, and an outlet or downstream portion 122 communicating with atmosphere. A second or outlet orifice 120 is positioned downstream of the inlet orifice 118. A pressure tap 124 is positioned between the orifices 118 and 120 in such manner that the upper chamber 110 is referenced to the fluid pressure between the orifices 118 and 120, namely, the inter-orifice pressure. In one embodiment of the present invention, the size of either one or both of the orifices is variable to change the pressure between the orifices relative to the pressure in the primary line 102.

Fluid flow between an upstream portion 121 of the secondary line 104 and the lower chamber 112 of the pressure regulator 100 is controlled by a valve 126 connected to a valve stem 128, which, in turn, is attached to the diaphragm 108. When there is no fluid flow through the primary line 102, the pressure, if any, of controlled fluid in secondary line 104 urges the valve 126 into a blocking position, as illustrated in FIG. 1. In this position, valve 126 blocks flow from secondary line 104 into the lower chamber 112.

As the pressure of the controlling gas in primary line 102 increases, there is a corresponding increase in pressure in the upper chamber 110. This increase in pressure results in downward movement of the diaphragm 108 and a corresponding movement of the valve 126 into a flow modulating position, as illustrated in FIG. 2. In this position, the valve both allows and modulates or controls fluid flow from secondary line 104 into the lower chamber 112. The controlled fluid, after entering the lower chamber 112 through inlet 130, leaves the chamber through outlet 132 and enters a downstream portion 134 of secondary line 104. The downstream portion 134 of secondary line 104 includes a mechanism, generally designated 136, for providing a fixed pressure loss. The mechanism can be a spring-loaded check valve 138.

After passing through the pressure loss mechanism 136 and, preferably, a metering orifice 139, the controlled fluid is supplied to an application device 140. One possible type of application device is a natural gas appliance with the controlling gas being air and the controlled fluid being natural gas. The flow control device of the present invention provides the correct pressure level and pressure range of the supplied natural gas as a function of the level and change in air pressure. Another possible type of application device is an air atomizing spray nozzle. The atomizing air flow is the controlling gas in primary line 102, while the controlled fluid is the fluid being atomized or dispersed which flows through the secondary line 104. It will be appreciated that the atomized fluid can be either a liquid or a gas. It will also be appreciated that many other types of application devices can be used with the flow control device of the present invention.

Considering now the operation of the flow control device illustrated in FIG. 1, a controlling gas, whose pressure is preferably regulated by a pressure regulator 141, flows through primary line 102 to an application device 140, such as an air atomizing spray nozzle, and through pressure divider 114 to atmosphere. The controlling gas experiences a pressure loss as it passes through the inlet orifice 118 of the pressure divider 114. The pressure downstream of inlet orifice 118 is maintained above ambient pressure by the outlet orifice 120. Orifices 118 and 120 are sized to achieve a predetermined inter-orifice pressure relative to the pressure in primary line 102. Any change in controlling gas pressure will automatically result in a linear change in inter-orifice pressure. Thus, if the controlling gas pressure is 10 p.s.i.g., and the orifices are sized to achieve a 10:1 pressure drop, namely, a 1 p.s.i.g. inter-orifice pressure at a 10 p.s.i.g. controlling gas pressure, a reduction of controlling gas pressure to 5 p.s.i.g. will result in an inter-orifice pressure of 0.5 p.s.i.g.

The inter-orifice pressure between orifices 118 and 120 is referenced to the upper chamber 110 of the housing 106 by pressure tap 124. This causes the diaphragm 108 to control the pressure of the controlled fluid as a function of the controlling gas pressure. Thus, the controlled fluid pressure is balanced against and follows the controlling gas pressure in a predetermined manner. More specifically, by properly sizing the diaphragm 108 and valve 126 in conventional manner, the valve 126 will open once a desired or threshold inter-orifice pressure, which may be essentially zero, has been achieved. Thereafter, the regulated pressure at the outlet 132 will vary as a function of and in a linear manner with the inter-orifice pressure.

Since it is desired that a given change in controlling gas pressure result in an entirely different change in controlled fluid pressure, a mechanism, such as the spring-loaded check valve 138, is included in secondary line 104 to provide a fixed pressure loss. The effect of the fixed pressure loss provided by the mechanism is most significant at low controlled fluid pressures, and becomes increasingly less significant as the controlled fluid pressure increases, thereby resulting in an automatically variable difference in pressure changes in the controlling gas as compared to the controlled fluid. The combination of a pressure divider and fixed pressure loss results in improved control of the controlled fluid pressure in the secondary line.

To illustrate the above, if there is a 10:1 difference in controlling gas pressure and inter-orifice pressure, and if a 0.25 p.s.i.g. fixed pressure loss is present in the secondary line 104, there will be no flow through the secondary line 104 to the application device 140 until the pressure in primary line 102 is greater than 2.5 p.s.i.g. When the controlling gas pressure increases to 5 p.s.i.g., the pressure at outlet 132 will be 0.5 p.s.i.g.; however, because of the fixed 0.25 p.s.i.g. pressure loss, the application device 140 will receive only 0.25 p.s.i.g. controlled fluid pressure. When the pressure in the primary line 102 increases to 10 p.s.i.g., the outlet 132 pressure will increase to 1 p.s.i.g., while the application device 140 will receive only 0.75 p.s.i.g. controlled fluid pressure. Thus, a change of the pressure in the primary line 102 from 5 to 10 p.s.i.g., a ratio of 1:2, will result in an application pressure change ratio of the controlled fluid of 1:3, that is, 0.75 divided by 0.25. Similarly, a change of pressure in the primary line 102 from 5 to 15 p.s.i.g., a ratio of 1:3, will result in an application pressure change ratio of the controlled fluid of 1:5, that is, 1.25 divided by 0.25.

It will be readily appreciated that numerous mechanisms can be used to provide the desired fixed pressure loss. For instance, a spring-loaded check valve 138, as illustrated in FIG. 1, can be placed in the secondary line downstream of the pressure regulator 100. Further, the fixed pressure loss can be obtained by appropriate design of the pressure regulator, for instance, a spring (not shown) can be used to hold the valve 126 closed until a desired inter-orifice pressure is achieved. Also, when desired, both of the preceding can be combined.

Still another possibility for achieving a difference in pressure changes of the controlling gas compared to the controlled fluid is to place a fixed pressure loss between the primary line 102 and the pressure divider 114. This embodiment is illustrated in FIG. 2. This embodiment is similar to the embodiment previously discussed in connection with FIG. 1, and the same reference numerals, with primes attached, have been used to identify the same or similar components.

With the embodiment illustrated in FIG. 2, a spring-controlled valve 142, which is similar to the previously discussed valve 138, is positioned in the inlet line 116' between the primary line 102' and the upstream orifice 118'. In operation, the embodiment of FIG. 2 is used as follows. First, the pressure of the controlling gas is subjected to a fixed pressure loss by valve 142 so that a change or variation in pressure in the controlling gas results in a different change or variation in pressure of the controlled fluid. Next, the pressure divider 114' reduces the controlling gas pressure, after the controlling gas has passed through the fixed pressure loss, from a first elevated pressure to a second or reduced pressure that is above ambient or atmospheric pressure. The pressure reduction occurs in such manner that the second or reduced pressure is a function of the first pressure. Finally, the reduced pressure is transmitted into upper chamber 110' and balanced by diaphragm 108' against the pressure of the controlled fluid in lower chamber 112 once valve 126' opens. In this manner, the pressure of the controlled fluid is controlled as a function of the pressure of the controlling gas.

In one embodiment of the present invention illustrated in FIG. 2, the valve 142 provides a 3 p.s.i.g. fixed pressure loss, while the orifices 118 and 120 provide a 10:1 pressure reduction. Thus, when the pressure of the controlling gas in the primary line 102' is 10 p.s.i.g., the upstream orifice 118' receives a pressure of 7 p.s.i.g., which is reduced to an inter-orifice pressure of 0.7 p.s.i.g. When the pressure of the controlling gas in the primary line 102' is reduced to 5 p.s.i.g., the upstream orifice 118' receives a pressure of only 2 p.s.i.g., which results in an inter-orifice pressure of 0.2 p.s.i.g. Thus, when the pressure of the controlling gas changes from 5 to 10 p.s.i.g., i.e., a change of 1:2, the controlled fluid experiences a pressure change of 1:3.5 (0.7 divided by 0.2).

Some examples of representative changes in pressure ratios obtainable with the present invention have already been discussed. Additional illustrative changes are set forth in the following table:

| APPLICATION | CONTROLLING GAS PRESSURE RANGE | CONTROLLED FLUID PRESSURE RANGE | FIXED PRESSURE LOSS |
|---|---|---|---|
| Oil Burner | 5 psig–13 psig | .58–1.5 psig | .25 psig (in pressure regulator) |
| Natural Gas Burner | 3 psig–7 psig | 1.3–5.5 inches water column (" W.C.) | 1.75 psig (upstream of pressure divider) |
| Propane Burner | 5 psig–10 psig | 5.5–11" W.C. | 3.7" W.C. (in pressure regulator) |

It will be appreciated that even higher pressures than those set forth in the table can be used. For instance, some high pressure heaters operate on 20 p.s.i.g. or higher controlled fluid pressures and modulate down to 5 p.s.i.g. In such cases, the controlling gas pressure must be significantly above 20 p.s.i.g., with a corresponding increase in the size of the fixed pressure loss. It will be understood that the listed ranges are merely illustrative of certain contemplated uses of the present invention. If desired, other ranges than those listed can be used.

As previously discussed, the sizes of the orifices used in the pressure divider in accordance with one embodiment of the invention can be varied to change the inter-orifice pressure. As long as the controlled pressure is greater than the inter-orifice pressure, the flow control device will be able to perform its control or modulating function. If the inter-orifice pressure exceeds the controlled pressure, control or modulation of the controlled fluid will not be possible, namely, changes in the inter-orifice pressure will have no effect on the pressure of the controlled fluid because its pressure will already have a predetermined value preset by its source pressure.

The invention has been described in detail with particular reference to preferred embodiments thereof, but it will be understood that variations and modifications can be effected within the spirit and scope of the invention. For example, while a diaphragm-type pressure regulator has been specifically illustrated herein, it will be understood that a piston-type pressure regulator or the like also can be employed. Also, the controlling gas in the primary line can be used solely to control or modulate the controlled fluid pressure, rather than additionally being used in the application device.

What is claimed is:

1. A flow control device for controlling the pressure of a controlled fluid in a secondary conduit as a function of the pressure of a controlling gas in a primary conduit, said device comprising:

a pressure regulator means including a housing and pressure responsive means dividing said housing into first and second chambers, said second chamber of said pressure regulator means being connected with the secondary conduit so that controlled fluid flowing through the secondary conduit passes through said second chamber;

pressure divider means in communication with the primary conduit and said first chamber so that the pressure in said first chamber is a function of the pressure of said controlling gas in the primary conduit;

valve means connected to said pressure responsive means for controlling fluid communication between an upstream portion of the secondary conduit and said second chamber, said valve means being movable between a first, blocking position preventing fluid flow through said second chamber, and a second flow modulating position permitting and controlling fluid flow through said second chamber, said valve means moving in response to changes in pressure applied to said first chamber so that fluid flow through said second chamber is a function of the pressure of said controlling gas, said valve means being in said blocking position when the pressure in said first chamber is less than a predetermined pressure; and means for defining a predetermined fixed pressure loss in communication with one of said pressure divider means and the secondary conduit so that a variation in pressure of said controlling gas results in a different variation in pressure of said controlled fluid.

2. A flow control device for controlling the pressure of a controlled fluid in a secondary conduit as a function of the pressure of a controlling gas in a primary conduit, said device comprising:

a primary conduit;

pressure regulator means including a housing having a first inlet, a second inlet, and an outlet;

diaphragm means positioned in said pressure regulator means and dividing said housing into first and second chambers, said first inlet communicating with said first chamber, said second inlet and said outlet communicating with said second chamber;

pressure divider means communicating with said primary conduit and said first inlet so that the pressure in said first chamber is a function of the pressure of controlling gas in said primary conduit;

a secondary conduit having an upstream portion connected to said second inlet and a downstream portion connected to said outlet of said housing so that said controlled fluid flowing through said secondary conduit passes through said second chamber;

valve means positioned in said pressure regulator means for controlling fluid communication between said upstream portion of said secondary conduit and said second chamber, said valve means being movable between a first, blocking position preventing fluid flow through said second chamber, and a second flow modulating position permitting and controlling fluid flow through said second chamber;

connection means positioned in said pressure regulator means for connecting said valve means to said diaphragm means in such manner that the position of said valve means varies in response to changes in pressure applied to said first chamber so that fluid flow through said second chamber is a function of the pressure of said controlling gas, said valve means being in said blocking position when the pressure in said first chamber is less than a predetermined pressure; and means for defining a predetermined fixed pressure loss operatively associated with one of said pressure divider means and said secondary conduit in such manner that a variation in pressure of said controlling gas results in a different variation in pressure of said controlled fluid.

3. A device according to claim 2, wherein said pressure divider means comprises spaced apart upstream and downstream orifices, and a pressure tap positioned between said orifices, said device further comprising conduit means connecting an inlet of said upstream orifice to said primary conduit, connecting an outlet of said downstream orifice to ambient, and connecting said pressure tap to said first inlet of said housing.

4. A device according to claim 2, wherein said fixed pressure loss means comprises a valve mechanism resiliently biased into a blocking position.

5. A device according to claim 4, wherein said valve mechanism is positioned upstream of said pressure divider means.

6. A method for controlling the pressure of a controlled fluid in a secondary conduit as a function of the pressure of a pressurized controlling gas in a primary conduit, said method comprising:

reducing the pressure of said controlling gas to a pressure above atmospheric pressure in a manner such that said reduced pressure varies as a function of said controlling gas pressure;

balancing said reduced pressure against the pressure of said controlled fluid so that the pressure of said controlled fluid is a function of said reduced pressure; and subjecting one of said controlling gas and said controlled fluid to a fixed pressure loss so that a variation in pressure of said controlling gas results in a different variation in pressure of said controlled fluid.

7. A method according to claim 6, wherein said reducing the pressure includes passing a portion of said controlling gas through a first orifice to thereby reduce the pressure of said portion of controlling gas, and subsequently passing said portion of said controlling gas through a second orifice, said reduced pressure between said two orifices being balanced against the pressure of said controlled fluid.

8. A method according to claim 7, wherein said balancing of said reduced pressure includes applying said reduced pressure to one side of a pressure responsive member operatively associated with said controlled fluid such that said pressure responsive member balances the reduced pressure against the pressure of said controlled fluid.

9. A method according to claim 6, wherein said reduced pressure is balanced against the pressure of said controlled fluid so that the pressure of said controlled fluid varies substantially linearly with said reduced pressure.

10. A method according to claim 6, wherein the pressure of said controlled fluid balanced by said reduced pressure is substantially the same as said reduced pressure.

11. A method for controlling the pressure of a controlled fluid supplied through a secondary conduit to an application device as a function of the pressure of a pressurized controlling gas supplied to the application device through a primary conduit, said method comprising:

reducing the pressure of said controlling gas to a pressure above atmospheric pressure, the pressure being reduced in a manner such that said reduced pressure varies as a function of the pressure of said controlling gas;

balancing said reduced pressure against the pressure of said controlled fluid so that the pressure of said controlled fluid is a substantially linear function of said reduced pressure; and subjecting one of said controlling gas pressure and said controlled fluid to a fixed pressure loss so that a predetermined controlling gas pressure must be exceeded before fluid flows through said secondary conduit to the application device, and so that a variation in pressure of said controlling gas results in a different variation in pressure of said controlled fluid.

* * * * *